United States Patent [19]

Eiermann

[11] 4,063,535
[45] Dec. 20, 1977

[54] ROTARY PISTON INTERNAL COMBUSTION ENGINE

[75] Inventor: Dankwart Eiermann, Lindau, Germany

[73] Assignee: Wankel GmbH, Berlin, Germany

[21] Appl. No.: 739,112

[22] Filed: Nov. 5, 1976

[30] Foreign Application Priority Data

Nov. 28, 1975 Germany .............................. 2553457

[51] Int. Cl.² ............................................. F02B 53/04
[52] U.S. Cl. .................................................. 123/8.13
[58] Field of Search ..................... 123/8.09, 8.11, 8.13

[56] References Cited

U.S. PATENT DOCUMENTS

| | | | |
|---|---|---|---|
| 3,780,707 | 12/1973 | Cole | 123/8.13 |
| 3,893,429 | 7/1975 | Jones | 123/8.13 |
| 3,964,446 | 6/1976 | Kohno et al. | 123/8.13 |
| 4,019,469 | 4/1977 | Yamamoto et al. | 123/8.13 |
| 4,020,799 | 5/1977 | Ishikawa | 123/8.13 |

Primary Examiner—William L. Freeh
Assistant Examiner—Leonard Smith
Attorney, Agent, or Firm—Walter Becker

[57] ABSTRACT

A rotary piston engine having fuel-air inlets controlled by the piston and which supply a stratified charge to the inlet chamber of the engine. The inlets comprise first inlets which are opened first and which supply a lean mixture along the sides of the cavity in which the piston moves and second inlets which supply a rich material to the central region of the cavity. Ignition of the rich mixture promotes complete combustion with a minimum of undesired combustion products, such as oxides of nitrogen, carbon monoxide, and the like.

6 Claims, 7 Drawing Figures

ROTARY PISTON INTERNAL COMBUSTION ENGINE

The present invention relates to a rotary piston internal combustion engine with a housing, which comprises a mantle the inner mantle surface of which in cross section forms a two-arc trochoid and which comprises lateral sections through which at a right angle an eccentric shaft passes. The eccentric of said eccentric shaft has rotatably mounted thereon a triangular piston which is rotatable at a ratio of 1:3 with regard to the speed of the eccentric shaft. The rotary piston internal combustion engine has separate inlets for a lean mixture for charging air on one hand and for a rich mixture on the other hand.

This inlet arrangement has the purpose of obtaining a load stratification which means to enrich a rich mixture within the region of the spark plug for the moment of ignition, whereas in the remaining portion of the space representing the working chamber, especially in that portion of said space which is close to the housing walls a lean mixture is distributed which is to be ignited only by the expanding flame front. The success of this step consists in that over the uniform distribution of the mixture, a lean super-stoichiometric air-fuel mixture can be employed for operating the engine. The exhaust gases consequently contain slight components of a $NO_x$, CO, and hexanes, and a corresponding fuel saving can be realized.

The charge stratification was realized first only by fuel injection. In order to be able to employ such stratification also in connection with carburetor engines, it has been suggested to subdivide the inlet passage or passages into passages for lean mixture or mere charging air, and into passages for rich mixture, while the filling of desired chamber regions is to be effected only with lean or only with rich mixtures.

U.S. Pat. No. 3,893,429 suggests to supply charging air only through a lateral inlet opening of the intake chamber, which inlet opening is arranged at a customary spot near the short housing axis. A second lateral inlet opening is in the rotary piston direction after the first inlet opening arranged laterally inwardly to such an extent that it opens only when the running-ahead corner of the intake chamber has reached the long housing axis and that said last mentioned inlet opening closes only at the end of the intake stroke. In this way, it is to be realized that a relatively rich mixture is in readiness for the ignition only in the rear portion of the chamber and that accordingly also the spark plug is arranged about half way between the ignition-upper-dead-center-point and the point of intersection of the long housing axis with the cold arc, in order to ignite the rich mixture in the rear chamber corner already prior to obtaining the maximum compression, whereupon the flame front is intended to move toward the front.

While such an arrangement can result in enriching the rich mixture in the rear wall chamber portion, it is not possible to keep this mixture away from the mantle path and the lateral walls of the chamber. For this reason, it is suggested to arrange the spark plugs in the lateral walls.

It is furthermore known that in the rear chamber corner a super-rich mixture which is no longer able to ignite will accumulate which above all is responsible for the hexane emission. This drawback is increased rather than decreased by the above mentioned known arrangement.

In German Offenlegungsschrift No. 2420947, there is described an inlet passage in the housing mantle which is directed to the point of intersection of the long housing axis with the cold arc. Fuel is to be injected into the charging air drawn in through said inlet opening, so that a rich mixture will be obtained. This mixture is to follow the mantle path and to whirl itself into a trough arranged in the front half of the piston flank. Through secondary inlet passages on both sides of the primary inlet passage, likewise pure charging air is blown in which whirls itself in the rear chamber section and is intended to displace the rich fuel-air mixture into the front chamber section. The ignition is effected within the region of the rich mixture in the front chamber section while additionally a second spark plug set back somewhat is provided. While in this way the above mentioned drawback of accumulation of the rich mixture in the rear chamber section would be avoided, the rich mixture would, however, not be kept away from the mantle path and would not be concentrated to the piston trough.

While there exists a better possibility to blow free the trailing chamber corner from the there dragged along super-rich mixture originating from the preceding working cycles, the lateral corners of said last mentioned corner would be reached. However, it is precisely here where the accumulation of fuel deposits occurs which are accumulated there by the "windshield wiper effect" of the sealing strips.

It is, therefore, an object of the present invention to concentrate the rich mixture in the piston trough in the front chamber corner for ignition at this spot and to keep it away from the mantle path and the side walls, and at the same time to completely blow the rear chamber corner free from partially or non-burned fuel components in order to obtain as complete as possible combustion of the fuel and to obtain a fuel saving resulting therefrom and also to obtain as great as possible reduction in harmful emissions.

These and other objects and advantages of the invention will appear more clearly from the following specification in connection with the accompanying drawings, in which.

Figure 1:
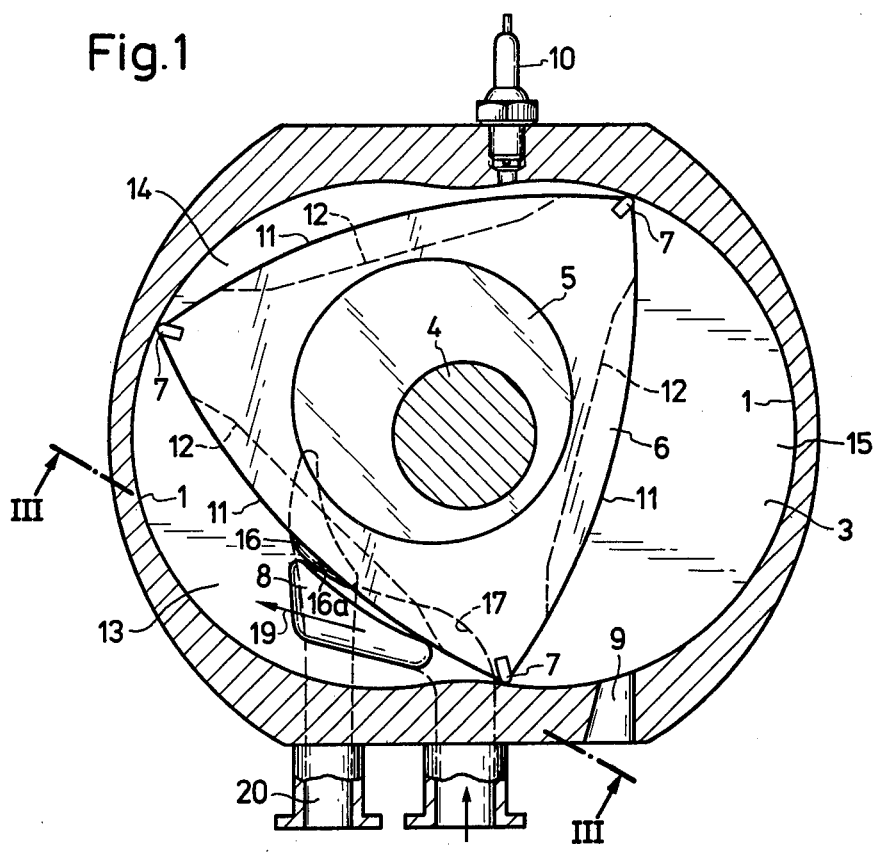
FIG. 1 represents a radial section through an engine according to the present invention at the very instant of opening up the secondary inlet opening with the primarily inlet openings in the side walls.

The rotary piston internal combustion engine according to the invention is characterized primarily in that primary inlet openings for the lean mixture are provided near the short housing axis, and that secondary inlet openings for rich mixture are provided in the side walls following in the direction of rotation of the piston and offset radially inwardly while the inlet passages leading to the primary inlet openings are in axial top view directed toward the curvature of the mantle path which curvature follows in direction of rotation of the piston, and in radial top view are directed at an acute angle of the corners of the respective side wall adjacent the respective inlet openings, and while the secondary inlet openings in axial top view are directed tangentially with regard to the flank of the piston while the latter occupies the position of opening said secondary inlet openings, and in radial top view are directed toward the front end of the trough of the piston while the latter occupies the position of opening said secondary inlet openings. The primary inlet openings may be arranged in the mantle path, but if desired, they may be arranged in the side walls.

The front control edges of the secondary inlet openings are expediently so arranged that they cover the edge of the piston at the time period where said piston has completed about half the intake stroke. At this time, the inflow is fastest, and therefore the directing effect of the inlet passages of said secondary inlet openings is strongest.

In order on one hand to assure the preparation of the rich mixture, and on the other hand to obtain a cooling of the piston and the eccentric, the feeding line for the charge to the secondary inlet opening may be, in a manner known per se, passed axially through perforations in the piston and through bores in the eccentric.

Referring now to the drawings in detail, the internal combustion engine illustrated in FIGS. 1-4 comprises a housing with a trochoidal two-arc mantle path, and with side walls 2 and 3. Through these side walls 3 there extends an eccentric shaft 4 which is substantially perpendicular to said side walls 2 and 3. A piston 6 is rotatably mounted on the eccentric 5 of said eccentric shaft 4. The piston 6 has its three corners 7 simultaneously in sliding engagement with the mantle path 1. The piston 6 is at its edges provided with (only partially illustrated) sealing elements which form a closed system. In the side walls 2,3, there are respectively provided at 8 lateral inlet openings for a fuel-air mixture, whereas at 9 there is provided an outlet opening for the burned gases, said outlet opening 9 extending through the mantle path. In the mantle path there is furthermore at 10 provided a spark plug for igniting the compressed mixture. The flanks 11 of the piston 6 are provided with trough-shaped recesses 12 which do not extend to the piston edges and in particular laterally leave free considerable areas. When the piston 6 rotates about the rotating eccentric 5, three working chambers form with varying volumes which alternately form the intake chamber 13, the combustion chamber 14, the expansion chamber 15, and the discharge chamber (28 in FIG. 5), in which a four-stroke cycle is carried out. Such engine is illustrated and described for instance in U.S. Pat. No. 2,988,065.

Figure 3:
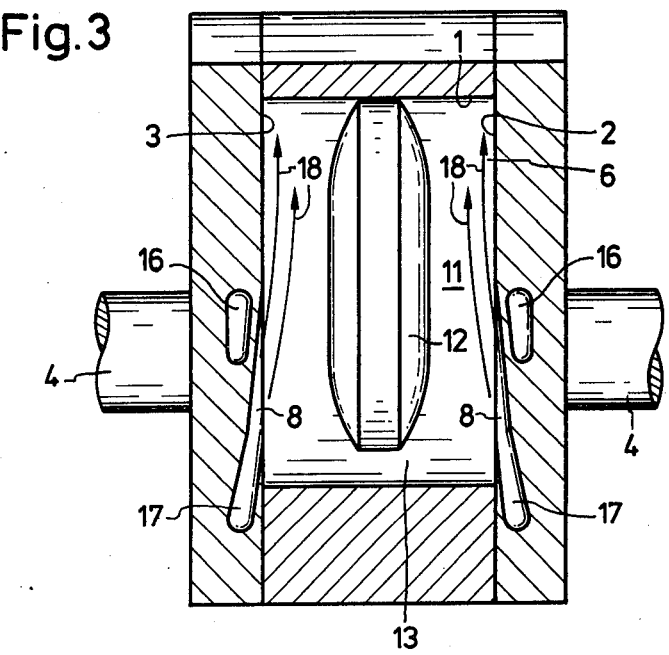
FIG. 3 represents an axis-parallel section through the same engine, said section being taken along the line III—III of FIG. 1.
Figure 2:
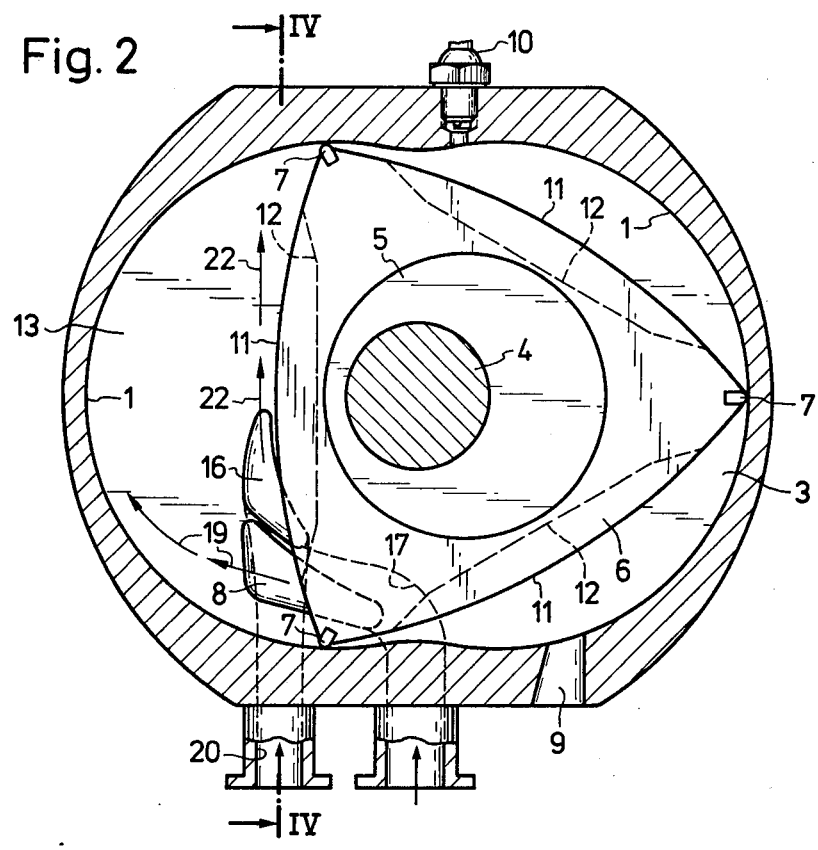
FIG. 2 is a radial section through the same engine shortly prior to the completion of the intake stroke.

The inlet openings 8 are intended for the feeding of a lean mixture. When viewing in the direction of rotation of the piston toward the inlet openings 8, there are secondary inlet openings 16 for a rich mixture arranged in the side walls 2 and 3. For each of the inlets there may be provided a separate non-illustrated carburetor. The inlet passages 17 which lead to the primary inlet openings 8 extend at such a flat angle to the planes of the side walls 2, 3 that the incoming flow through said inlet passages 7 of the lean mixture is passed substantially along the wide walls 2 and 3 as indicated in FIG. 3 by the arrows 18. Viewed in axial top view, the direction of the inlet passages 17 points to the mantle path 1 as illustrated in FIGS. 1 and 2 by arrows 19. The lean mixture will during this phase of movement of the piston fill the chambers adjacent the mantle path, and the side walls 2 and 3.

Figure 4:
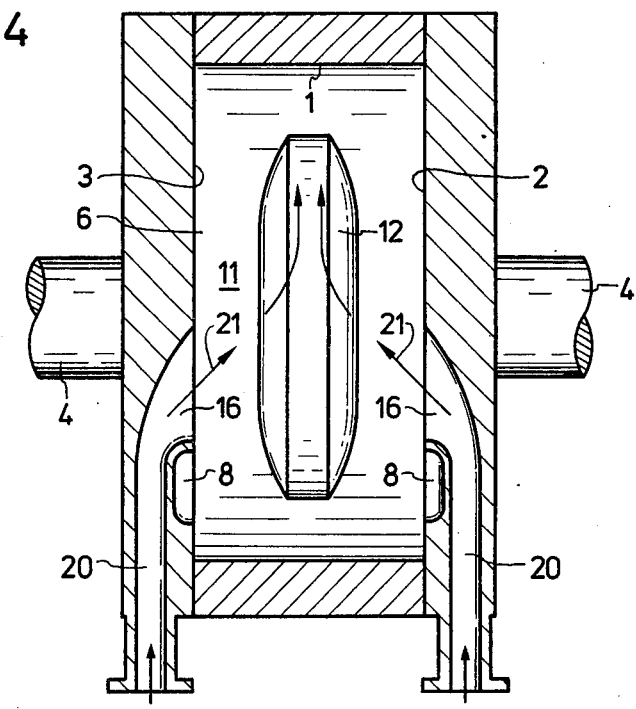
FIG. 4 shows an axis-parallel section through the same machine which section is taken along the line IV—IV of FIG. 2.

The inlet passages 20 which lead to the secondary inlet openings 16 are, however, directed at an obtuse angle with regard to the planes of the side walls 2 and 3 as is illustrated in FIG. 4 and indicated by the arrows 21 so that the flow of the rich mixture as it passes from the inlet pasages 20 into the intake chamber 13 is directed toward the front end of the piston groove 12 (when viewed in the direction of rotation of piston 6). This represents the time period during which the secondary inlet opening 16 is being opened. In axial top view as indicated by the arrows 22 in FIG. 2, the inlet passages 20 and thus the flow direction of the rich mixture extends in a direction tangential to the piston flank 11 in the position of the piston during the opening up of the secondary inlet openings 16. The secondary inlet openings, when viewing in the direction of piston 6, are located behind the inlet openings 8 and are offset radially inwardly to such an extent that they are opened by the edge of piston 6 only when the inlet openings 8 have been fully opened and when the inflow velocity is greatest.

While, therefore, during the further opening of the intake chamber 13, the lean mixture deposits along the mantle path and side walls 2 and 3, the rich mixture fills the space in and about the piston trough without reaching the housing side walls and the mantle path. The high inflow speed from the secondary inlet openings 16 when edge 16a thereof is uncovered permits a displacement of the lean mixture from the region of the piston trough 12 if said lean mixture should have filled these spaces ahead of the rich mixture.

The leading corner of the intake chamber 13 will likewise be filled substantially with the lean mixture inasmuch as during the first phase of the intake stroke it communicates only with the inlet openings 8. This brings about the advantage that in this chamber which during the complete compression of the compression chamber 14 is cap-shaped, and therefore is only under difficulties accessible to the combustion and which chamber is reached only last by the flame front, an oxygen-rich and well burnable mixture is available.

The same applies to the trailing corner of the intake chamber 13. When the piston occupies a position which follows the phase illustrated in FIG. 2, the primary and secondary inlet openings 8 and 16 occupy a position shortly prior to being closed by the piston edge. The rear chamber part can at this time period be filled only through the rear inlet openings 8 and no longer through the secondary inlet openings 16 which are located further toward the front.

With this stratification of the chamber filling, a collection of partially or non-burned mixture can no longer occur in the respective rear chamber portion because neither a fuel deposit on the mantle path, nor on the side walls 2 and 3 can occur.

This is due to the fact that such fuel deposit on the mantle path 1 and side walls 2 and 3 can no longer be reached by the rich mixture, and that in toto due to the nearly ideal charge stratification, a maximum possible combustion occurs. Due to the lean mixture passing through the primary inlet opening 8 up to the end of the intake phase, the rear chamber portion and in particular its side wall near the corners are blown free from partially or totally unburned mixture residues from preceding working cycles.

The ignition expediently is effected in the position of piston 6 in the front portion of the piston trough 12 in which the rich mixture is concentrated (see FIG. 1).

Figure 5:
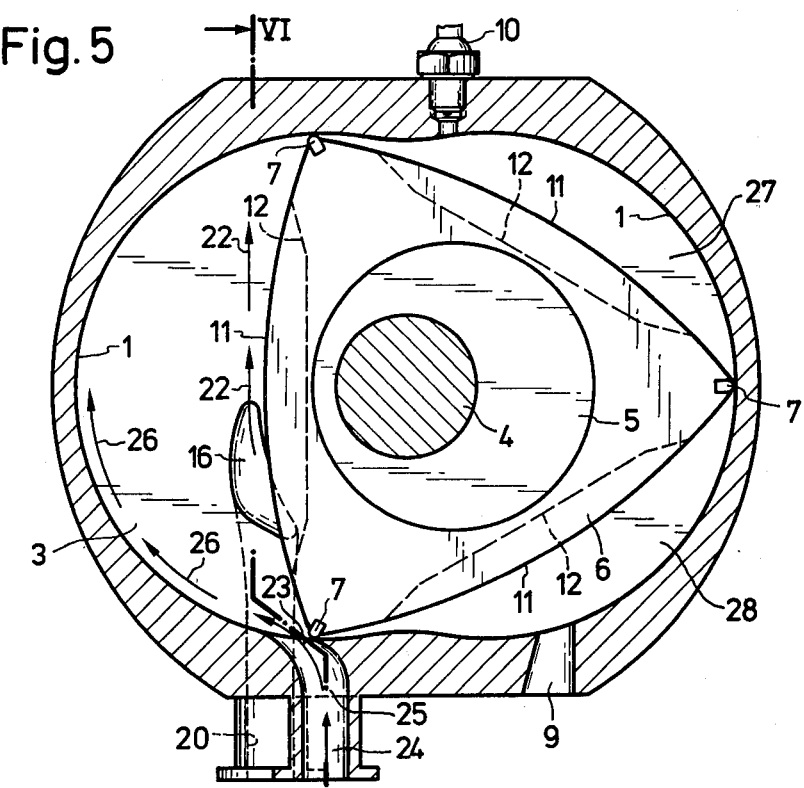
FIG. 5 illustrates a radial section through another embodiment of the invention according to the present invention with the same piston position as shown in FIG. 2 and with the primary openings in the mantle path.
Figure 6:
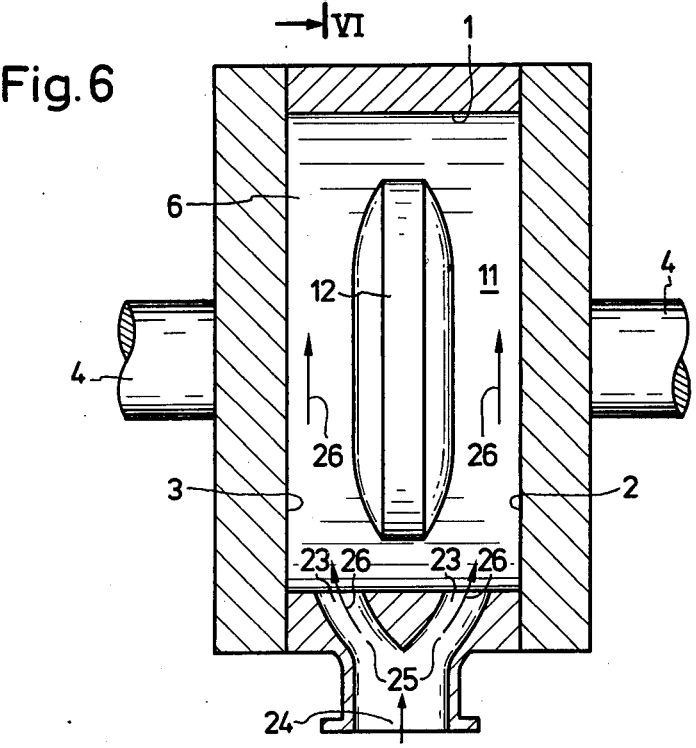
FIG. 6 illustrates an axis-parallel broken section through the engine of FIG. 5, said section being taken along the line VI—VI of FIG. 5.

FIGS. 5 and 6 show another embodiment of the invention according to which the inlet openings for the lean mixture are provided at 23 in the mantle path. These inlet openings are displaced laterally toward the side walls 2 and 3 and are arranged axis-parallelly adjacent each other. The inlet passage 24 leading to said inlet openings in side walls 2 and 3 fall into two passages which in radial top view extend at an acute angle to the planes of the side walls 2 and 3 as shown in FIG. 6 and in axial top view are directed toward the mantle path as shown in FIG. 5. The flow passing from the inlet openings 23 is thus directed along the side walls 2 and 3 and toward the mantle path as indicated by the arrows 26 in FIGS. 5 and 6. Consequently, the same charge stratification is obtained as described with the above outlined embodiment. Similarly, also the remaining arrangement of the engine is the same. In FIG. 5, the chamber 27 is in the expansion phase and chamber 28 is in the discharge phase.

This arrangement has the advantage that the rear corner of the intake chamber, shortly prior to the closing of the inlet opening 23 can better be blown free by this entering flow of the lean mixture than is the case with the above described preceding embodiment. It will be appreciated that with the previously described embodiment, the trailing piston edge of the intake chamber cannot be directly reached from the lateral inlet openings 8 by the flow, which lateral inlet openings 8 are in view of the lateral sealing parts (not illustrated) radially arranged away from the mantle path 1. With the embodiment of FIGS. 5 and 6, the lateral wall near corners of the trailing piston edge can be particularly well blown free as shown in FIG. 6.

Figure 7:
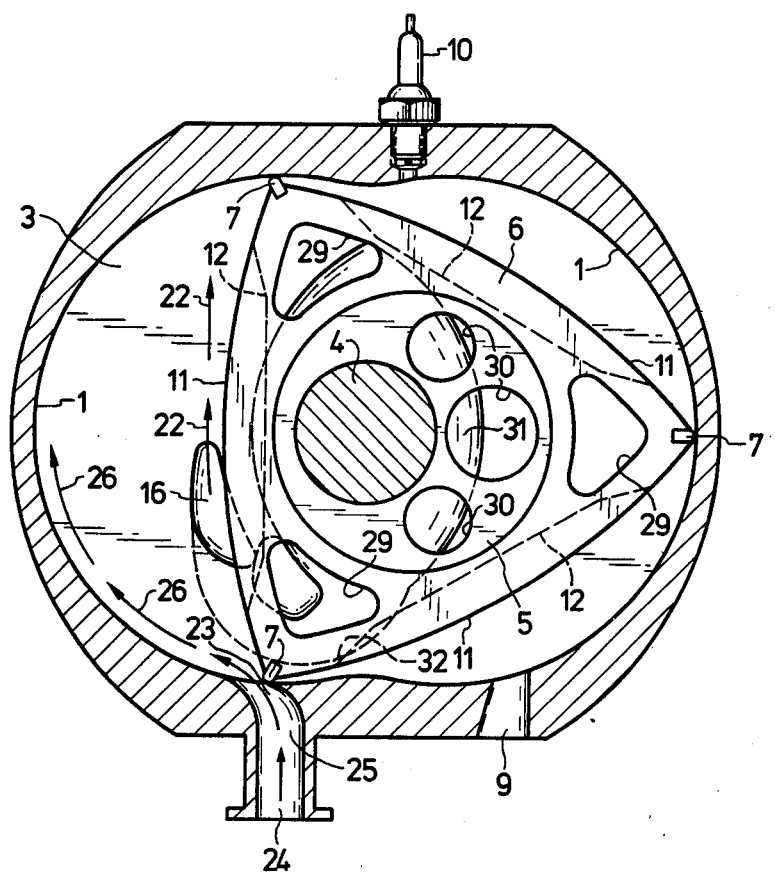
FIG. 7 is a radial section through still another embodiment of the invention according to FIG. 5 with piston and eccentric cooling by means of the charge introduced through the secondary inlet openings.

A further embodiment is illustrated in FIG. 7 which as to its arrangement of the inlet openings 23 and 16 and of the inlet passages 24, 25 and 20 corresponds to the last mentioned embodiment. The rich mixture introduced through the inlet opening 16 of the intake chamber 13 is in this instance employed for cooling the piston and eccentric. The piston 6 is provided with axial perforations 29 located toward the corners, and the eccentric is provided with axial bores 30 through which passes the mixture coming from the carburetor. By means of a recess 31 which in axial top view (FIG. 7) is approximately elliptical or circular wedge-shaped and which is located in the side walls 2 and 3, the mixture passed through piston and eccentric is collected and conveyed to the inlet opening 16 through a further recess 32. Such piston cooling arrangement is described in detail in German Pat. No. 1,301,613. The combination of this piston cooling arrangement with the inlet arrangements according to the invention has the advantage that the reduction of the degree of filling which occurs when employing the entire charge for the cooling of the piston is substantially obviated. This is due to the fact that only a small portion of the charge is heated by the cooling operation and is expanded. The cooling effect as such is not reduced by the fact that only a portion of the charge is passed through the piston eccentric because the cooling is effected primarily by the evaporation of the carried-along fuel. Thus — and this represents an important improvement of the described inlet arrangement and charge stratification — an already prepared rich mixture passes through the secondary inlet openings 16 into the intake chamber 13. The combustion can thus considerably be improved without the necessity of providing additional fuel preparing devices.

It is also within the scope of the present invention when through the primary inlets 18, 23 instead of a lean mixture, pure charging air and the entire fuel is contained in the charge introduced through the secondary inlets 16. The special advantage of the invention consists in that due to the thus obtained charge stratification, the emission of $NO_x$ can considerably be reduced and that furthermore with low pressure carburetors or other low pressure mixture-preparing devices a charge stratification can be obtained as it was possible heretofore only by high-pressure injection.

It is, of course, to be understood that the present invention is, by no means, limited to the specific showing in the drawings, but also comprises any modifications within the scope of the appended claims.

What is claimed is:

1. A rotary piston internal combustion engine having a housing with a two arc trochoidal cavity and a three sided piston for orbital and rotary movement in the cavity and a shaft supporting the piston, means for supplying a stratified charge to the cavity comprising first axially spaced and second axially spaced fuel-air inlets in said housing and controlled by said piston as the piston moves in the cavity, said first inlets supplying a lean mixture to said cavity and said second inlets supplying a rich mixture to said cavity, the positioning of said inlets being such that said first inlets open before said second inlets, first supply passage means connected to said first inlets and inclined in the direction of movement of the piston to supply the lean mixture to the cavity near the axial ends of said piston, a circumferential groove formed in about the axial center of each side of the piston, second supply passage means connected to said second inlets and inclined in the direction of piston movement and toward the axial central region of the piston for the supply of the rich mixture to the cavity toward the axially central region of the piston and to the groove in the respective side of the piston, and ignition means positioned in the housing to ignite the rich mixture therein.

2. An engine according to claim 1 in which at least said first inlets are in the peripheral wall of said cavity.

3. An engine according to claim 1 in which at least said first inlets are in the end walls of said cavity.

4. An engine according to claim 1 in which said second inlets are so located as to remain closed until the first inlets are fully open and the piston is about midway in the intake stroke.

5. An engine according to claim 1 in which said first passage means supply the lean mixture near the outer periphery of the cavity and generally tangentially of the cavity.

6. An engine according to claim 1 in which said second passage means supply the rich mixture near the periphery of the piston and substantially tangentially thereto.

* * * * *